United States Patent [19]
Iijima et al.

[11] Patent Number: 6,096,792
[45] Date of Patent: *Aug. 1, 2000

[54] SILICONE RUBBER SPONGE COMPOSITION AND SILICONE RUBBER SPONGE USING IT

[75] Inventors: Hiroyoshi Iijima; Makoto Sawada; Isao Iida, all of Tokyo, Japan

[73] Assignee: Toshiba Silicone Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/848,021

[22] Filed: Apr. 28, 1997

Related U.S. Application Data

[63] Continuation-in-part of application No. 08/551,425, Nov. 1, 1995, abandoned.

[30] Foreign Application Priority Data

Nov. 4, 1994 [JP] Japan ..................................... 6-271107

[51] Int. Cl.$^7$ ....................................................... C08J 9/10
[52] U.S. Cl. ................................................................ 521/94
[58] Field of Search ................................ 521/94, 95, 154, 521/96, 150

[56] References Cited

U.S. PATENT DOCUMENTS

| | | | |
|---|---|---|---|
| 3,776,885 | 12/1973 | Mac Leay | 260/46.56 |
| 4,129,531 | 12/1978 | Rauer | 521/94 |
| 4,460,748 | 7/1984 | Rauer | 521/95 |
| 4,983,642 | 1/1991 | Nakano et al. | 521/88 |
| 5,120,385 | 6/1992 | Takahashi et al. | 521/91 |

FOREIGN PATENT DOCUMENTS

| | | |
|---|---|---|
| 0073038 | 3/1983 | European Pat. Off. . |
| 2137630 | 3/1984 | United Kingdom . |

*Primary Examiner*—Morton Foelak
*Attorney, Agent, or Firm*—Sughrue, Mion, Zinn, Macpeak & Seas, PLLC

[57] ABSTRACT

A silicone rubber sponge composition obtained by compounding a polyorganosiloxane having an average degree of polymerization of 3,000 to 300,000, a reinforcing silica filler, 1,1'-azo-bis(1-acetoxy-1-phenylethane) as a foaming agent, and organic peroxides and/or addition reaction curing agents. The silicone rubber sponge composition can provide a silicone rubber sponge which has a high foaming ratio, has a fine and uniform cell structure, has excellent surface smoothness of the skin layer, does not show a surface tackiness, has a good compression set, and does not require a post cure of a long time.

9 Claims, No Drawings

SILICONE RUBBER SPONGE COMPOSITION AND SILICONE RUBBER SPONGE USING IT

CROSS REFERENCE TO THE RELATED APPLICATION

This application is a continuation-in-part application of U.S. patent application Ser. No. 08/551,425, filed Nov. 1, 1995, abandoned, entitled "SILICONE RUBBER SPONGE COMPOSITION AND SILICONE RUBBER SPONGE USING IT".

FIELD OF THE INVENTION

The present invention relates to a silicone rubber sponge composition and a silicone rubber sponge using the composition, and more specifically, the invention relates to a silicone rubber sponge composition capable of obtaining a silicone rubber sponge which is excellent in the foamability, has a fine cell structure, is excellent in the surface smoothness of the skin layer, has no surface tackiness, has a good compression set, is a safe material on hygiene since decomposition gas generated in foaming is a non-toxic material, and does not need a post cure of a long time, and also to a silicone rubber sponge using the composition.

BACKGROUND OF THE INVENTION

Hitherto, a silicone rubber sponge is well known as a material excellent in the weather resistance, the electric characteristics, and the compression set.

The silicone rubber sponge is fundamentally obtained by compounding a thermosetting silicone rubber composition with an organic foaming agent and a curing agent and foaming and curing the compounded mixture by heating, but in this case, it is important that the silicone rubber sponge obtained is excellent in the surface smoothness of the skin layer, has no surface tackiness, has a good compression set, and does not impair the inherent properties that a silicone rubber possesses. From such a view point, hitherto an organic peroxide or an addition reaction type curing agent has been generally used as a curing agent, and azobisisobutyronitrile (AIBN) has been generally used as a foaming agent.

However, when azobisisobutyronitrile (AIBN) is used, a post cure of a long time is required in order to remove a decomposition product which is considered to be harmful, which causes a problem of prolonging the production time. Hence for shortening the production time, shortening the post cure time has been desired.

For the purpose, methods of using other foaming agents than azobisisobutyronitrile have been investigated, and for example, a method of using azodicarbonamide (ADCA) or dinitropentamethylenetetramine (DPT) is proposed as described in JP-A-55-29565 (the term "JP-A" as used herein means an "unexamined published Japanese patent application"). However, these foaming agents scarcely foam by simply compounding with a silicone rubber compound containing organic peroxides and/or addition reaction curing agents and undergo free foaming only under a hot blast, like the case of using azobisisobutyronitrile. Also in the case of using these foaming agents, there are problems that the silicone rubber sponges formed are greatly poor in the surface smoothness and give a tacky feeling on the surfaces thereof.

Recently, as a method of solving these problems, a method of using a silicone polymer, wherein a 1-ethyl-1-butyl group, an ethylidenenorbonyl group, etc., is used as the crosslinking group in place of a conventional vinyl group, as the base polymer (JP-A-2-16132) and a method of using a silicone polymer, wherein a cycloalkyl group such as cyclohexyl group, etc., is used as the crosslinking group, as the base polymer (JP-A-2-251542) are proposed.

However, although the foaming property, the surface smoothness and the surface tackiness are improved in these methods, these methods have a defect that the silicone rubber sponges formed are greatly poor in the compression set characteristics as compared with the sponge moldings obtained using azobisisobutyronitrile as the foaming agent.

Furthermore, the case of using a silicone polymer which does not have an aliphatic unsaturated group such as a vinyl group, etc., that is, a silicone polymer wherein the organic groups bonded to the silicon atom are composed of a methyl group, an ethyl group, a propyl group, a phenyl group, a 3,3,3-trifluoropropyl group, etc., as the base polymer is reported. However, in this case, although the problems of the surface smoothness and the surface tackiness are solved, it is very difficult to control crosslinking and also the compression set characteristics are greatly poor.

On the other hand, the prior art does not show that 1,1'-azo-bis(1-acetoxy-1-phenylethane) is compounded with a silicone rubber composition, but U.S. Pat. Nos. 4,129,531 and 4,460,748 disclose the embodiment that 1,1'-azo-bis(1-acetoxy-1-phenylethane) is compounded with polymers or copolymers. Those U.S. patents achieve curing or simultaneous curing/foaming of polymers or copolymers by using a specific azo compound as a curing agent.

However, such an azo compound is not recently used at all as the curing agent for the thermosetting silicone rubber composition. The reason for this is that the vulcanization effect of the azo compound to the thermosetting silicone rubber composition is insufficient as compared with organic peroxides or addition reaction type curing agents, and a practical rubber elastomer cannot be obtained.

In order to confirm this fact, the present inventors conducted experiments to examine the effect of 1,1'-azo-bis(1-acetoxy-1-phenylethane) on the thermosetting silicone rubber composition. As a result, only very insufficient vulcanization effect was obtained, and a practical rubber elastomer could not be obtained.

In this regard, U.S. Pat. No. 2,613,119 discloses that an aliphatic azo compound functions as a useful vulcanizing agent for a silicone rubber. However, on the other hand, JP-B-44-461 discloses that the vulcanization effect of azobisisobutyronitrile (AIBN) which is the representative example of the aliphatic azo compounds is insufficient.

U.S. Pat. No. 4,129,531 discloses a method for crosslinking polymers using azo esters including 1,1'-azo-bis(1-acetoxy-1-phenylethane). However, a silicone rubber is not disclosed in the polymers. Further, the object thereof is to crosslink an elastomer other than the silicone rubber.

U.S. Pat. No. 4,460,748 discloses the effect as a curing agent of azo compounds exemplifying 1,1'-azo-bis(1-acetoxy-1-phenylethane) similar to U.S. Pat. No. 4,129,531. Although examples of the polymers or copolymers disclosed therein include a silicone rubber, a combination of 1,1'-azo-bis(1-acetoxy-1-phenylethane) and the thermosetting silicone rubber composition is not disclosed, and there is no disclosure to suggest such a combination. Basically, U.S. Pat. No. 4,460,748 uses a crosslinking intensifier as the essential component, which is not used in the present invention. If such a crosslinking intensifier is added to the composition of the present invention, compression set or heat resistance of the sponge may greatly deteriorate, or tackiness may occur on the sponge surface.

The object of U.S. Pat. No. 4,460,748 is to enable polymers or copolymers to cure by adding a crosslinking intensifier even if the amount of the azo compound added is small. However, the thermosetting silicone rubber composition does not substantially cure even if a large amount of 1,1'-azo-bis(1-acetoxy-1-phenylethane) is added as a curing agent. Therefore, it is meaningless to add the crosslinking intensifier.

As described above, to obtain a silicone rubber sponge having a high foaming ratio and a uniform cell structure, a method of using an organic peroxide or an addition reaction type catalyst as the curing agent and also using azobisisobutyronitrile as the foaming agent has hitherto been generally used, but in this case a post cure of long time is required in order to remove a decompostion product which is considered to be harmful. Thus, there is a problem in the productivity as described above, and the development of a technique substituting for the above-described method has been demanded.

However, the conventional methods proposed or reported as described above have problems in the foaming property, the surface smoothness, and the surface tackiness as well as there is a defect that the compression set characteristics are greatly poor. Further, where an azo compound is used as a curing agent, there is the problem that the vulcanization effect to the thermosetting silicone rubber composition is insufficient, and a practical rubber elastomer cannot be obtained. Thus, satisfactory methods of obtaining silicone rubber sponges have not yet been obtained in the actual situation.

SUMMARY OF THE INVENTION

The present invention has been made to overcome the problems in the conventional techniques.

Accordingly, one object of the present invention is to provide a silicone rubber sponge composition capable of obtaining a silicone rubber sponge, which has a high foaming ratio, has a uniform cell structure, has no problems in the surface smoothness and the surface tackiness, has good compression set characteristics, and does not need a post cure of a long time, without using azobisisobutyronitrile as the foaming agent.

Another object of the present invention is to provide a silicone rubber sponge using the composition.

As a result of various investigations for attaining the objects described above, the inventors have found that by using a definite amount of 1,1'-azo-bis(1-acetoxy-1-phenylethane) as the foaming agent, a silicone rubber sponge which has an excellent foaming property even under a hot blast, has a fine cell structure, is excellent in the surface smoothness of the skin layer, does not show a surface tackiness, has a good compression set, is preferable on hygienic safety since decomposition gas generated in foaming is a non-toxic material, and does not need a post cure of a long time can be easily prepared, and have accomplished the present invention.

According to one embodiment of the present invention, there is provided a silicone rubber sponge composition comprising (A) 100 parts by weight of a polyorganosiloxane having an average degree of polymerization of 3,000 to 300,000, (B) 1 to 100 parts by weight of a reinforcing silica filler, (C) 1 to 30 parts by weight, per 100 parts by weight of the sum of the component (A) and (B) of 1,1'-azo-bis(1-acetoxy-1-phenylethane) as a foaming agent, and (D) a necessary amount of at least one member selected from the group consisting of organic peroxides and addition reaction type curing agents.

According to another embodiment of the present invention, there is provided a silicone rubber sponge prepared by foaming and curing the thermosetting silicone rubber sponge composition.

The silicone rubber sponge obtained according to the present invention has excellent foamability, has a fine cell structure, has excellent surface smoothness of the skin layer, does not have surface tackiness, has good compression set, is preferable on hygienic safety since decomposition gas generated in foaming is a non-toxic material, and does not need a post cure of a long time, making it possible to greatly shorten production time and to improve productivity.

DETAILED DESCRIPTION OF THE INVENTION

The present invention is described in detail below.

First, the constituent components which constitute the silicone rubber sponge composition of the present invention are explained.

The polyorganosiloxane as component (A) has an average degree of polymerization of 3,000 to 300,000. If the average degree of polymerization is less than 3,000, mechanical strength of the silicone rubber sponge obtained is decreased, and on the other hand, if the average degree of polymerization is more than 300,000, it is difficult to blend a filler, decreasing workability. It is preferred for the polyorganosiloxane to be substantially linear, but the polyorganosiloxane may be partially branched within the usable range.

There is no particular limitation on the polyorganosiloxane where organic peroxides are used as component (D). However, a polyorganosiloxane wherein at least one of the organic groups bonded to silicon atoms in one molecule is a vinyl group is generally used. Where addition reaction type curing agents are used as component (D), a polyorganosiloxane wherein at least one of the organic groups bonded to silicon atoms in one molecule is used.

Organic groups other than a vinyl group are monovalent substituted or unsubstituted hydrocarbon groups. Examples of the organic groups include unsubstituted hydrocarbon groups such as an alkyl group (e.g., methyl, ethyl, propyl, butyl, hexyl or dodecyl), an aryl group (e.g., phenyl), or an aralkyl group (e.g., β-phenylpropyl), and substituted hydrocarbon groups such as chloromethyl or 3,3,3-trifluoropropyl. Methyl is generally used from the standpoint of ease of synthesis of the polyorganosiloxane.

The reinforcing silica filler as component (B) is a material necessary to improve workability of the silicone rubber sponge composition, mechanical strength of the silicone rubber sponge, and the like. Examples of the such a filler which can be used include wet silica, fumed silica, silica aerogel, calcined silica, etc., which are conventionally used. A non-reinforcing silica such as ground quartz, diatomaceous earth or the like may also be used together.

Those fillers each may be used as is without modification or may be surface-treated with an organosiloxane, a polyorganosiloxane, a hexaorganodisiloxane, or the like.

The reinforcing silica filler is generally used in an amount of 1 to 100 parts by weight per 100 parts by weight of the polyorganosilixane of component (A), but the amount thereof is not limited to this range.

1,1'-Azo-bis(1-acetoxy-1-phenylethane) of component (C) is a characteristic component for imparting the effect of the present invention to the silicone rubber sponge composition or the silicone rubber sponge of the present invention. 1,1'-Azo-bis(1-acetoxy-1-phenylethane) has substantially the same melting point, decomposition temperature and activation energy as those of azobisisobutyronitrile (AIBN). Therefore, the silicone rubber sponge obtained using 1,1'-azo-bis(1-acetoxy-1-phenylethane) has excellent foaming property under a hot blast, has a fine cell structure, has excellent surface smoothness of a skin layer, does not have a surface tackiness, and has good compression set, the same as in the silicone rubber sponge obtained using AIBN.

Decomposition gas of 1,1'-azo-bis(1-acetoxy-1-phenylethane) is a non-toxic material, although decomposition gas of AIBN is not preferable on hygienic safety. Therefore, use of 1,1'-azo-bis(lacetoxy-1-phenylethane) is very preferable on working environment. Further, the silicone rubber sponge obtained using AIBN needs a post cure of a long time in order to completely remove decomposition product of AIBN, which is considered to be harmful, decreasing the productivity. Contrary to this, the silicone sponge rubber obtained using 1,1'-azo-bis(1-acetoxy-1-phenylethane) of the present invention does not need a post cure of a long time, making it possible to greatly shorten production time and to improve the productivity.

1,1'-Azo-bis(1-acetoxy-1-phenylethane) of component (C) is used in an amount of 1 to 30 parts by weight, and preferably 3 to 10 parts by weight, per 100 parts by weight of the sum of components (A) and (B). If the amount of component (C) is less than 1 part by weight, a sufficient foaming ratio cannot be obtained, and if the amount of component (C) exceeds 30 parts by weight, fineness of the cell structure is lost. The term "sufficient foaming ratio" used herein generally means 2 times or more, preferably 2 to 6 times. If the foaming ratio is less than 2 times, heat insulating property and low hardness which are inherent in a sponge cannot be obtained.

It is necessary for the 1,1'-azo-bis(1-acetoxy-1-phenylethane) of component (C) to have an average particle diameter of 100 $\mu$m or less, preferably 50 $\mu$m or less, and more preferably 20 $\mu$m or less. If the average particle diameter exceeds 100 $\mu$m, the silicone rubber sponge obtained loses fine uniformity of cells.

The organic peroxides and/or the addition reaction type curing agents of component (D) are an essential component for obtaining the silicone sponge rubber of the present invention, and have a function to completely cure the silicone rubber sponge composition of the present invention.

Examples of the organic peroxides include benzoyl peroxide, paramethylbenzoyl peroxide, orthomethylbenzoyl peroxide, 2,5-dimethyl-2,5-di-t-butyl peroxyhexane, t-butyl peroxybenzoate, dicumyl peroxide, and cumyl-t-butyl peroxide. Those organic peroxides may be used alone or as mixtures of two or more thereof.

Where hot-air vulcanization is carried out, acyl type peroxides such as benzoyl peroxide, paramethylbenzoyl peroxide or orthomethylbenzoyl peroxide, which have the half-life period temperature for 1 minute of 100 to 150° C. in the above organic peroxides, are used, thereby easily obtaining the desired silicone sponge rubber.

The organic peroxides are used in an amount of preferably 0.05 to 15 parts by weight per 100 parts by weight of the polyorganosiloxane of component (A) and the reinforcing silica filler of component (B). If the amount of the organic peroxides added is less than 0.05 part by weight, the vulcanization is not carried out sufficiently, and if the amount thereof exceeds 15 parts by weight, not only cannot more specific effects by increasing the amount be obtained, but also the organic peroxides may adversely affect physical properties of the silicone rubber sponge obtained.

Examples of the addition reaction type curing agents include a curing catalyst and a crosslinking agent.

Examples of the curing catalyst which can be used are platinum type catalysts such as chloroplatinic acid, platinum-olefin complex, platinum-vinylsiloxane complex, platinum black, or platinum-triphenylphosphine complex, and the examples of the crosslinking agent which can be used are polyorganosiloxanes having on the average at least two hydrogen atoms bonded to silicon atoms in one molecule.

The curing catalyst in the addition reaction type curing agents is preferably used in an amount of 1 to 1,000 ppm calculated as platinum element per 100 parts by weight of the sum of component (A) and component (B). If the amount of the curing catalyst added is less than 1 ppm, curing does not proceed sufficiently, and if the amount thereof exceeds 1,000 ppm, improvement on the reaction rate cannot particularly be expected.

The crosslinking agent in the addition reaction type curing agents is used in an amount such that the number of hydrogen atoms bonded to silicon atoms in the crosslinking agent is preferably 0.5 to 4.0, and more preferably 1.0 to 3.0, per one alkenyl group in component (A). If the number of hydrogen atoms is less than 0.5, curing of the composition does not proceed sufficiently, and if the number of hydrogen atoms exceeds 4.0, physical properties and heat resistance of the composition after curing are decreased.

The silicone rubber sponge composition of the present invention may further contain oxides, hydroxides or carbonates of Group I or II metals in the periodic table, or hydrotalcite compounds, as component (E). Component (E) acts to remove inherent odor generated in decomposition of component (C) from the silicone rubber sponge obtained.

Examples of the Group I or II metals include Li, K, Na, Mg, Zn and Ca. Examples of oxides, hydroxides or carbonates of those metals include LiOH, KOH, NaOH, BaO, $BaO_2$, $Ba(OH)_2$, MgO, $Mg(OH)_2$, $MgCO_3$, ZnO, $Zn(OH)_2$, $ZnCO_3$, CaO, $Ca(OH)_2$, and $CaCO_3$.

The hydrotalcite compounds are the compound represented by the formula

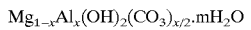

wherein x is 0.3 to 0.33, and m is 0 to 0.5.

Examples of the hydrotalcite compounds are $Mg_{4.5}Al_2(OH)_{13}CO_3 \cdot 3.5H_2O$ and $Mg_{4.5}Al_2(OH)_{13}CO_3$.

The component (E) is preferably used in an amount of 0.1 to 30 parts by weight per 100 parts by weight of the sum of components (A) and (B). If the amount of component (E) is less than 0.1 part by weight, the effect of component (E) added is not exhibited, and if the amount thereof exceeds 30 parts by weight, not only is the effect by increasing the amount thereof not obtained, but also heat resistance and compression set of the silicone rubber sponge obtained may be decreased.

In addition to the above-described components, the silicone rubber sponge composition of the present invention may further contain semi-reinforcing or non-reinforcing fillers in an amount such that it does not hinder the effect of the present invention.

Examples of the semi-reinforcing or non-reinforcing fillers include carbon black, ground silica, diatomaceous earth, metal carbonates, clay, talc, mica and titanium oxide. Of those, carbon black is explained below as the representative example of the above semi-reinforcing or non-reinforcing fillers.

Carbon black which can be used is generally a conductive carbon black which is conventionally used in conductive rubber compositions.

Examples of the carbon black include acetylene black, conductive furnace black (CF), super conductive furnace black (SCF), extra conductive furnace black (XCF), conductive channel black (CC), and furnace black or channel black heat-treated at high temperature of about 1,500° C.

Examples of acetylene black are Denka Acetylene Black (trade name, made by Denki Kagaku Kogyo K.K.) and Shounigan Acetylene Black (trade name, made by Shounigan Chemical Co.). Examples of conductive furnace black are Continex CF (trade name, made by Continental Carbon Co.) and Balkan C (trade name, made by Cabot Co.). Examples of super conductive furnace black are Continex SCF (trade mane, made by Continental Carbon Co.) and Balkan CS (trade name, made by Cabot Co.). Examples of extra conductive furnace black are Asahi HS-500 (trade name, made by Asahi Carbon K.K.) and Balkan XC-72 (trade name, made by Cabot Co.). Examples of the conductive channel black are Colax L (trade name, made by Degussa Co.), etc. Ketchen Black EC and Ketchen Black EC-600JD (trade names, made by Ketchen Black International Co.), which are one kind of furnace black, can also be used.

The conductive carbon black is used in an amount of generally 1 to 100 parts by weight, and preferably from 10 to 70 parts by weight, per 100 parts by weight of the organopolysiloxane of component (A). If the amount of the conductive carbon black is less than 1 part by weight, a desired electroconductivity may not be obtained, and if the amount thereof is over 100 parts by weight, mechanical strength of the silicone rubber sponge obtained may be poor.

Also, the silicone rubber sponge composition of the present invention can be compounded with a heat resistant additive, a flame retardant, an antioxidant, a processing aid, an electroconductivity imparting agent, etc., which are conventionally used for silicone rubber compositions. Furthermore, it is possible to compound the silicone rubber sponge composition of the present invention with carbon, a ferrite powder, etc., and mold the resulting composition by ultrahigh frequency induction heating.

As described above, the silicone rubber sponge composition of the present invention comprises the polyorganosiloxane and having compounded therewith the reinfocing silica filler, 1,1'-azo-bis(1-acetoxy-1-phenylethane) as a foaming agent, and the organic peroxides and/or the addtion reaction type curing agents as a curing agent. Therefore, the silicone rubber sponge composition can easily produce a silicone rubber sponge which has excellent foaming property, has a fine cell structure, has excellent surface smoothness of the skin layer, does not show a surface tackiness, has good compression set, is preferable on hygienic safety since decomposition gas generated in foaming is a non-toxic material, and does not need a post cure of a long time.

Further, the silicone rubber sponge obtained is very useful as a gasket roll, an electroconductive roll, a heat-insulating material, a cushion material, etc.

The present invention is described below in more detail by reference to the following examples, but it should be understood that the invention is not construed as being limited thereto. Unless otherwise indicated, all parts, percents, ratios and the like are by weight.

EXAMPLE 1

100 Parts of a terminal-dimethylvinyl group-blocked polydimethylsiloxane containing 0.1 mole % of methylvinylsiloxane unit and having an average degree of polymerization of 8,000 were charged in a kneader, and 40 parts of fumed silica having a specific surface area of 200 $m^2/g$, surface-treated with dimethylpolysiloxane were then added thereto. The resulting mixture was kneaded in the kneader at 150° C. for 2 hours, and then cooled, thereby obtaining a base compound.

100 Parts of the base compound obtained above were compounded with 4 parts of 1,1'-azo-bis(1-acetoxy-1-phenylethane) having an average particle diameter of 15 $\mu$m, 0.5 part (15 ppm as platinum to the total weight) of a platinum complex of chloroplatinic acid and tetramethylvinyldisiloxane as a curing catalyst, and 1.0 part of a both terminal-trimethylsiloxy group-blocked dimethylsiloxane/methylhydrogen siloxane copolymer (the content of hydrogen atom bonded to the silicon atoms: 0.8%) as a crosslinking agent. The resulting mixture was mixed with two rolls until the mixture became uniform.

The silicone rubber compound obtained above was supplied to an extruder and continuously extruded at 5 m/minute to obtain a tubular silicone rubber compound having a cross section of the outer diameter of 30 mm and the inner diameter of 15 mm. The tube was cut in a length of 50 cm and allowed to stand in a dryer at 200° C. for 10 minutes to obtain a silicone rubber sponge. The silicone rubber sponge thus obtained had a fine and uniform cell structure. The specific gravity the silicone rubber sponge was 0.31, and the foaming ratio thereof was 3.7 times. Further, the skin layer surface of the silicone rubber sponge was smooth, and the silicone rubber sponge had a very preferable appearance without showing any tackiness. The compression set (50% compression, 180° C.×22 hours) was 10%.

EXAMPLE 2

100Parts of the same base compound as used in Example 1 above were compounded with 4 parts of 1,1'-azo-bis(1-acetoxy-1-phenylethane) having an average particle diameter of 10 $\mu$m, and 0.6 part of benzoyl peroxide and 0.8 part of dicumyl peroxide as curing agents, and the resulting mixture was mixed with two rolls until the mixture became uniform. The same procedure as in Example 1 was then followed to obtain a silicone rubber sponge. The silicone rubber sponge thus obtained had a fine and uniform cell structure. The specific gravity the silicone rubber sponge was 0.29, and the foaming ratio thereof was 4.0 times. Further, the skin layer surface of the silicone rubber sponge was smooth, and the silicone rubber sponge had a very preferable appearance without showing any tackiness. The compression set (50% compression, 180° C.×22 hours) was 22%.

Comparative Example 1

Example 1 above was followed except that an organic foaming agent, AIBN (ME 800, trade name, made by Toshiba Silicone Co., Ltd.), was compounded in place of 1,1'-azo-bis(1-acetoxy-1-phenylethane), to obtain a silicone rubber sponge. The specific gravity of the silicone rubber sponge thus obained was 0.33, and the foaming ratio thereof was 3.5 times. The silicone rubber sponge thus obtained had a fine and uniform 5 cell structure. Further, the skin layer surface of the silicone rubber sponge was smooth, and the silicone rubber sponge had a very preferable appearance without showing any tackiness. Also, the compression set (50% compression, 180° C. ×22 hours) was 23%. However, a post cure of 200° C.×4 hours was conducted to remove decomposition products of AIBN.

Comparative Example 2

Example 1 above was followed except that an organic foaming agent, azodicarbonamide (CELLMIC CAP 500, trade name, made by Sankyo Kasei K.K.) was compounded in place of 1,1'-azo-bis(1-acetoxy-1-phenylethane), to obtain a silicone rubber sponge. The specific gravity of the silicone rubber sponge thus obtained was 0.88 (the foaming ratio: 1.3 times), and the silicone rubber sponge was not almost foamed. The silicone rubber sponge thus obtained had a rough cell structure, and further, the skin layer surface of the silicone rubber sponge had no smoothness and showed a tackiness. Also, the compression set (50% compression, 180° C.×22 hours) was 92% and was very poor.

EXAMPLE 3

100 Parts of polydimethylsiloxane containing 0.13 mole % of a methylvinylsiloxane unit and having an average degree of polymerization of 7,000 were charged in a kneader, and 18 parts of acetylene black (DENKA BLACK, trade name, made by Denki Kagaku Kogyo K.K.), and 17 parts of surface-treated fumed silica (AEROSIL R-972, trade name, made by Nippon Aerosil K.K.) were then added thereto. The resulting mixture was kneaded to obtain a conductive silicone rubber compound. 100 Parts of the conductive silicone rubber compound thus obtained was compounded with 3 parts of 1,1'-azo-bis(1-acetoxy-1-phenylethane) having an average particle diameter of 10 μm, 0.5 part (15 ppm as platinum to the total weight) of a platinum complex of chloroplatinic acid and tetramethylvinyldisiloxane as a curing agent, and 1.0 part of a both terminal-trimethylsiloxy group-blocked dimethylsiloxane/methylhydrogen siloxane copolymer (the content of hydrogen atoms bonded to silicon atoms: 0.8%) as a curing agent. The resulting mixture was kneaded with two rolls until the mixture became uniform. Using the resulting mixture, a silicone rubber sponge was obtained in the same manner as in Example 1 above. The silicone rubber sponge thus obtained had a fine and uniform cell structure. The specific gravity of the silicone rubber sponge was 0.50, and the foaming ratio thereof was 2.7 times. Further, the skin layer surface of the silicone rubber sponge was smooth, and the silicone rubber sponge had a very preferable appearance without showing any tackiness. The compression set (50% compression, 180° C.×22 hours) was 8%. Also, the volume resistivity of the silicone rubber sponge was $5 \times 10^5$ Ω.cm.

Comparative Example 3

100 Parts of the base compound obtained in Example 1 were compounded with 6 parts of 1,1'-azo-bis(1-acetoxy-1-phenylethane) having an average particle diameter of 10 μm as a curing agent. The resulting blend was cured in the same manner as in Example 1, but curing did not substantially occur.

EXAMPLE 4

A silicone rubber sponge was obtained in the same manner as in Example 2 except that 1,1'-azo-bis(1-acetoxy-1-phenylethane) having an average particle diameter of 90 μm was used. The silicone rubber sponge thus obtained had a fine and uniform cell structure, but had cells having a size slightly larger than that of the sponge obtained in Example 2. The specific gravity of the silicone rubber sponge was 0.29, and the foaming ratio thereof was 4.0 times. Further, the skin layer of the silicone rubber sponge was smooth, and the silicone rubber sponge had a very preferable appearance without showing any tackiness. The compression set (50% compression, 180° C.×22 hours) was 21%.

EXAMPLE 5

A silicone rubber sponge was obtained in the same manner as in Example 1 except that 100 parts of the base compound obtained in Example 1 were compounded with 15 parts of a calcium powder. The silicone rubber sponge thus obtained had a fine and uniform structure. The specific gravity of the silicone rubber sponge obtained was 0.34, and the foaming ratio thereof was 3.5 times. The skin layer of the silicone rubber sponge was smooth, and the silicone rubber sponge had a very preferable appearance without showing any tackiness. The compression set (50% compression, 180° C.×22 hours) was 8%. Odor of the silicone rubber sponge was examined, but it was odorless. Further, odor was examined on the silicone rubber sponge obtained in Example 1. As a result, it was found to have a slight odor when 1,1'-azo-bis(1-acetoxy-1-phenylethane) was decomposed.

Comparative Example 4

Example 2 was followed except that 0.3 part of triallyl cyanurate was used in place of 0.6 part of benzoyl peroxide and 0.8 g of dicumyl peroxide, and the drying time was changed to 40 minutes. The resulting product showed a slight foaming. However, when the product was crushed with fingers, the product was easily crushed, and was not restored to the original shape.

Comparative Example 5

Example 2 was followed except that 4 parts of 2,2'-azo-bis(2-acetoxy-4-methylpentane) were used in place of 1,1'-azo-bis(1-acetoxy-1-phenylethane) and the drying time was changed to 40 minutes, to obtain a silicone rubber sponge having a specific gravity of 0.94 (foaming ratio: 1.2 times). The silicone rubber sponge thus obtained was not almost foamed and was very hard. The silicone rubber sponge had a rough cell structure, and a skin layer surface of the silicone rubber sponge did not have a smoothness. Further, the compression set (50% compression, 180° C.×22 hours) was 96%.

Comparative Example 6

Example 2 was followed except that the amount of 1,1-azo-bis(1-acetoxy-1-phenylethane) was changed to 10 parts, benzoyl peroxide and dicumyl peroxide were not added, and the drying time was changed to 15 minutes. Foaming and curing did not occur in the resulting product.

Comparative Example 7

Example 2 was followed except that 4 parts of 2,2'-azo-bis(2-acetoxy-4-methylpentane) were used in place of 4 parts of 1,1'-azo-bis(1-acetoxy-1-phenylethane), 0.3 part of triallyl cyanurate was used in place of 0.6 part of benzoyl peroxide and 0.8 g of dicumyl peroxide, and the drying time was changed to 40 minutes. The resulting product showed a slight foaming. However, the product had a rough cell structure, and a skin layer surface of the product did not have a smoothness. When the product was crushed with fingers, the product was easily crushed, and was not restored to the original shape. Thus, curing did not occur at all in the product.

Comparative Example 8

Example 2 was followed except that 1,1-azo-bis(1-acetoxy-1-phenylethane) was not used, and 3 parts of triallyl cyanurate were used in place of 0.6 part of benzoyl peroxide and 0.8 part of dicumyl peroxide. However, foaming and curing did not occur in the resulting product.

While the invention has been described in detail and with reference to specific embodiments thereof, it will be apparent to one skilled in the art that various changes and modifications can be made therein without departing from the spirit and scope thereof.

What is claimed is:

1. A foamable silicone rubber sponge composition consisting essentially of
   (A) 100 parts by weight of a polyorganosiloxane having an average degree of polymerization of 3,000 to 300,000
   (B) 1 to 100 parts by weight of a reinforcing silica filler,
   (C) 1 to 30 parts by weight, per 100 parts by weight of the sum of components (A) and (B), of 1,1'-azo-bis(1-acetoxy-1-phenylethane) as a foaming agent which can be decomposed to generate a gas to yield a sponge, and
   (D) at least one member selected from the group consisting of organic peroxides in an amount of 0.05 to 15 parts by weight of the polyorganosiloxane (A) and the reinforcing silica filler (B) and addition reaction type curing agents which will act to cure the sponge composition.

2. The foamable silicone rubber sponge composition as claimed in claim 1, wherein the at least one kind of organic peroxides (D) is an acyl type organic peroxide having a half-life period temperature for 1 minute of 100 to 150° C.

3. The foamable silicone rubber sponge composition as claimed in claim 1, wherein the component (D) is the addition reaction type curing agents.

4. The foamable silicone rubber sponge composition as claimed in claim 1, wherein the component (C) has an average particle diameter of 100 $\mu$m or less.

5. The foamable silicone rubber sponge composition as claimed in claim 1, wherein the composition further comprises oxides, hydroxides or carbonates of Group I or II metals in the periodic table, or hydrotalcite compounds in an amount of 0.1 to 30 parts by weight per 100 parts by weight of the components (A) and (B).

6. A silicone rubber sponge obtained by foaming and curing the silicone rubber sponge composition as claimed in claim 1.

7. The silicone rubber sponge as claimed in claim 6, wherein the sponge has a foaming ratio of 2 to 6 times.

8. A silicone rubber sponge obtained by foaming and curing the foamable silicone rubber sponge composition as claimed in claim 5.

9. The silicone rubber sponge as claimed in claim 8, wherein the sponge has a foaming ratio of 2 to 6 times.

* * * * *